(12) United States Patent
Garner et al.

(10) Patent No.: US 10,206,326 B2
(45) Date of Patent: *Feb. 19, 2019

(54) PLANTING UNIT FOR A SEEDING MACHINE HAVING A SEED METER AND SEED DELIVERY SYSTEM

(71) Applicant: Deere & Company, Moline, IL (US)

(72) Inventors: Elijah B. Garner, Bettendorf, IA (US); Lee E. Zumdome, Bettendorf, IA (US); Nathan A. Mariman, Geneseo, IL (US); Michael E. Friestad, Rock Island, IL (US)

(73) Assignee: DEERE & COMPANY, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/454,870

(22) Filed: Mar. 9, 2017

(65) Prior Publication Data

US 2017/0172056 A1    Jun. 22, 2017

Related U.S. Application Data

(63) Continuation of application No. 14/505,829, filed on Oct. 3, 2014, now Pat. No. 9,661,799, which is a
(Continued)

(51) Int. Cl.
| | |
|---|---|
| *A01C 7/04* | (2006.01) |
| *A01C 7/16* | (2006.01) |
| *A01C 7/20* | (2006.01) |

(52) U.S. Cl.
CPC ............ *A01C 7/046* (2013.01); *A01C 7/16* (2013.01); *A01C 7/20* (2013.01)

(58) Field of Classification Search
CPC combination set(s) only.
See application file for complete search history.

(56) References Cited

U.S. PATENT DOCUMENTS

| | | |
|---|---|---|
| 1,376,933 A | 5/1921 | Gould, Jr. |
| 1,480,963 A | 1/1924 | Sproull |
| | (Continued) | |

FOREIGN PATENT DOCUMENTS

| | | |
|---|---|---|
| BR | PI9701145-2 A | 12/1998 |
| BR | PI0104497-4 A | 5/2002 |
| | (Continued) | |

OTHER PUBLICATIONS

Brazilian Patent Office Action and Written Opinion for Application No. BR112013024408-9 dated Apr. 2, 2018 (9 pages, statement of relevance included).
(Continued)

*Primary Examiner* — Alicia Torres
(74) *Attorney, Agent, or Firm* — Michael Best & Friedrich LLP

(57) ABSTRACT

A planting unit for a seeding machine having a frame member and a seed meter mounted thereto. The seed meter has a housing and a metering member rotatably mounted therein. The metering member has a sidewall with an inner surface and an outer surface with a rim portion of the sidewall adjacent an outer edge of the sidewall. The inner surface of the side wall and the housing form a trough at a bottom portion of the metering member to hold a seed pool. A mechanical seed delivery system takes seed from the metering member and moves seed to a discharge location adjacent a seed furrow formed in soil beneath the seeding machine.

8 Claims, 15 Drawing Sheets

Related U.S. Application Data continuation of application No. 13/072,051, filed on Mar. 25, 2011, now Pat. No. 8,850,998.

(56) References Cited

U.S. PATENT DOCUMENTS

| | | | |
|---|---|---|---|
| 2,566,406 A * | 9/1951 | Dougherty | A01C 7/04 222/225 |
| 2,960,258 A | 11/1960 | Dodwell | |
| 3,077,290 A * | 2/1963 | Rehder | A01C 7/04 111/135 |
| 3,156,201 A | 11/1964 | Tweedale | |
| 3,176,636 A * | 4/1965 | Wilcox | A01C 7/18 111/51 |
| 3,636,897 A * | 1/1972 | Brink | A01C 7/04 111/173 |
| 3,693,833 A | 9/1972 | Weitz | |
| 3,757,995 A | 9/1973 | Armstrong | |
| 3,903,815 A | 9/1975 | Winkler | |
| 3,990,606 A | 11/1976 | Gugenhan | |
| 4,023,509 A | 5/1977 | Hanson | |
| 4,037,755 A | 7/1977 | Reuter | |
| 4,600,122 A | 7/1986 | Lundie et al. | |
| 4,793,511 A * | 12/1988 | Ankum | A01C 7/046 111/77 |
| 4,949,869 A | 8/1990 | Ribouleau | |
| 5,025,736 A | 6/1991 | Anderson | |
| 5,170,909 A | 12/1992 | Lundie et al. | |
| 5,720,233 A | 2/1998 | Lodico et al. | |
| 5,855,303 A | 1/1999 | Gregor | |
| 6,293,438 B1 | 9/2001 | Woodruff | |
| 6,352,042 B1 | 3/2002 | Martin et al. | |
| 6,499,414 B2 | 12/2002 | Dunham | |
| 6,516,733 B1 | 2/2003 | Sauder et al. | |
| 6,564,730 B2 | 5/2003 | Crabb et al. | |
| 6,581,535 B2 | 6/2003 | Barry et al. | |
| 6,651,570 B1 | 11/2003 | Thiemke | |
| 6,681,706 B2 * | 1/2004 | Sauder | A01C 7/04 111/171 |
| 6,729,249 B2 | 5/2004 | Bauder et al. | |
| 6,752,095 B1 | 6/2004 | Rylander et al. | |
| 6,932,236 B2 | 8/2005 | Ven Huizen | |
| 7,448,334 B2 | 11/2008 | Mariman et al. | |
| 7,513,200 B2 | 4/2009 | Friestad | |
| 7,661,377 B2 | 2/2010 | Keaton et al. | |
| 8,336,471 B2 | 12/2012 | Gilstring | |
| 8,752,490 B2 | 6/2014 | Beaujot | |
| 8,850,998 B2 * | 10/2014 | Garner | A01C 7/046 111/171 |
| 8,985,037 B2 | 3/2015 | Radtke et al. | |
| 2003/0183647 A1 | 10/2003 | Ven Huizen | |
| 2007/0039529 A1 | 2/2007 | Sauder et al. | |
| 2007/0107645 A1 | 5/2007 | Mariman et al. | |
| 2007/0125284 A1 | 6/2007 | Mariman | |
| 2010/0192818 A1 | 8/2010 | Garner et al. | |
| 2010/0192819 A1 | 8/2010 | Garner et al. | |
| 2010/0224110 A1 | 9/2010 | Mariman | |
| 2012/0067260 A1 | 3/2012 | Garner et al. | |
| 2015/0013581 A1 * | 1/2015 | Garner | A01C 7/046 111/171 |

FOREIGN PATENT DOCUMENTS

| | | |
|---|---|---|
| BR | PI0305993-6 A | 5/2005 |
| BR | PI0605292-4 A | 9/2007 |
| BR | PI0604798-0 A | 11/2007 |
| BR | PI0703545-4 A | 4/2008 |
| EP | 2213152 | 8/2010 |
| RU | 2044436 | 9/1995 |
| RU | 2343675 | 1/2009 |
| WO | 2010059101 | 2/2010 |
| WO | 2010059101 A1 | 5/2010 |
| WO | 2010124360 A1 | 11/2010 |

OTHER PUBLICATIONS

Brazilian Patent Office Action and Written Opinion for Application No. BR112013024381-3 dated Feb. 6, 2018 (9 pages, statement of relevance included).
Brazilian Patent Office Action and Written Opinion for Application No. BR112013024397-0 dated May 7, 2018 (10 pages statement of relevance included).
International Search Report and Written Opinion for Application No. PCT/US2012/030326 dated Mar. 18, 2013 (8 pages).
International Search Report and Written Opinion for Application No. PCT/US2012/030281 dated Jun. 20, 2012 (6 pages).
International Search Report and Written Opinion for Application No. PCT/US2012/030306 dated Jun. 20, 2012 (12 pages).
Canadian Patent Office Action for Application No. 2,831,061 dated May 4, 2018 (3 pages).
Canadian Patent Office Action for Application No. 2,831,069 dated May 10, 2018 (4 pages).
Canadian Patent Office Action for Application No. 2,831,078 dated May 7, 2018 (4 pages).

* cited by examiner

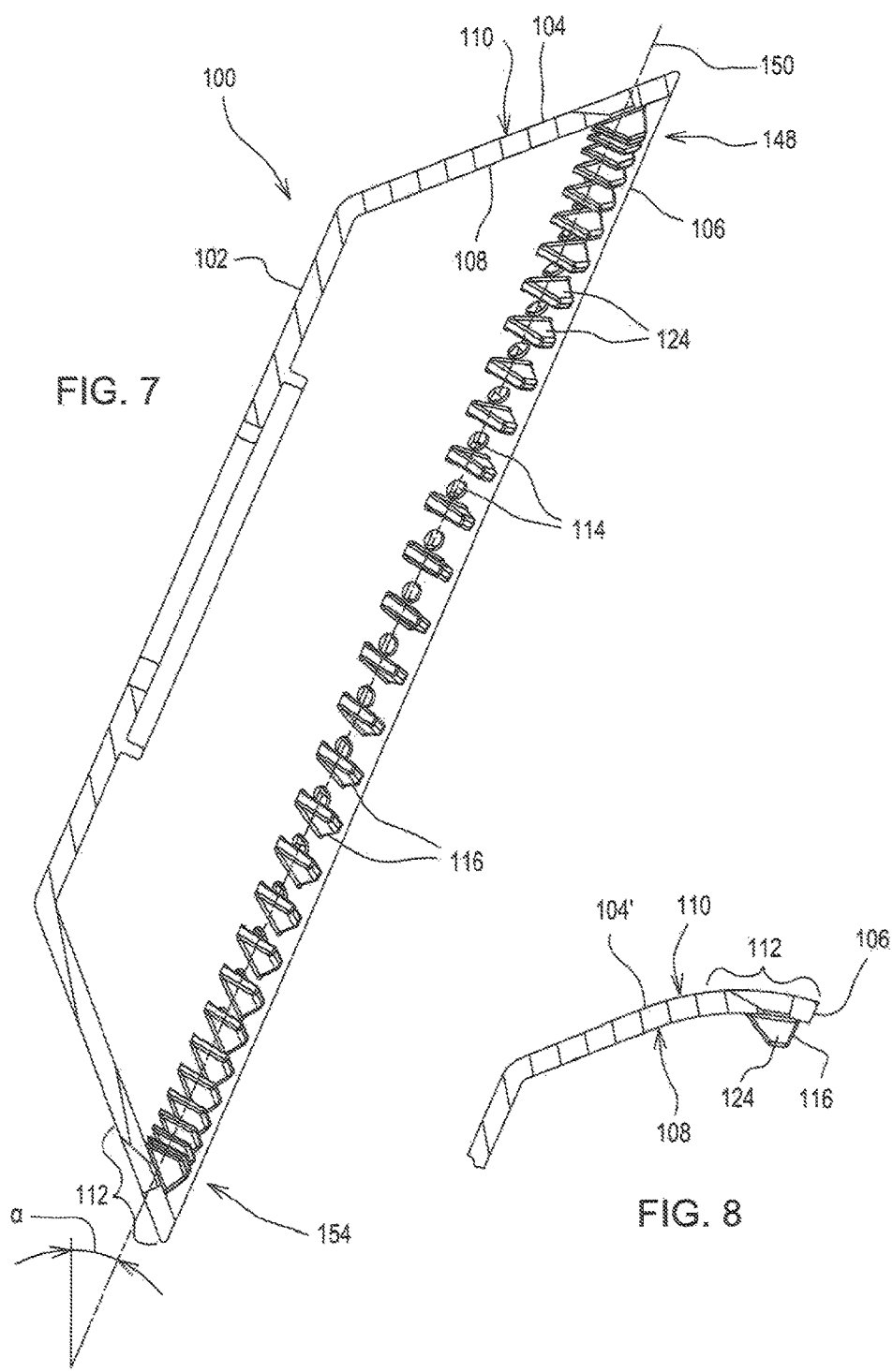

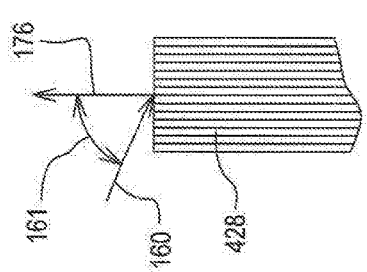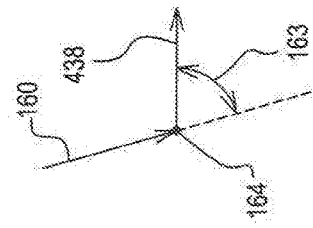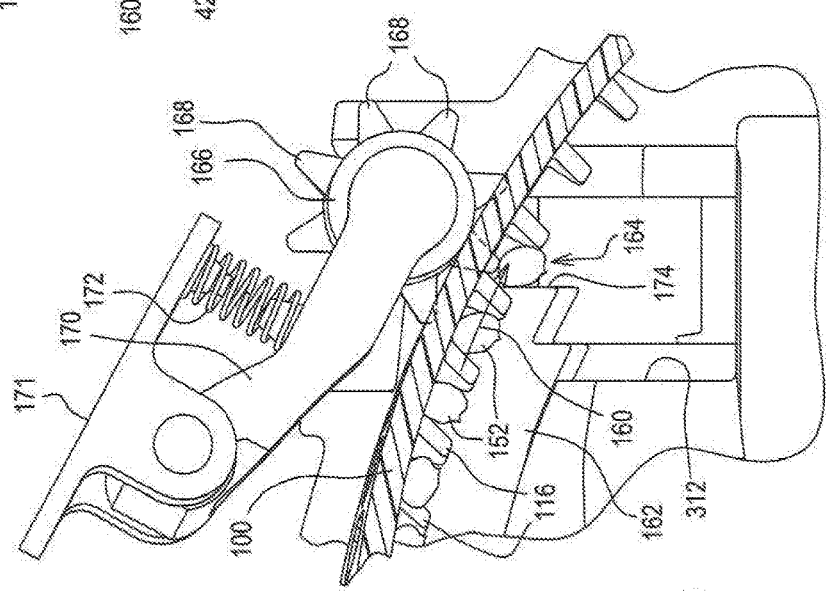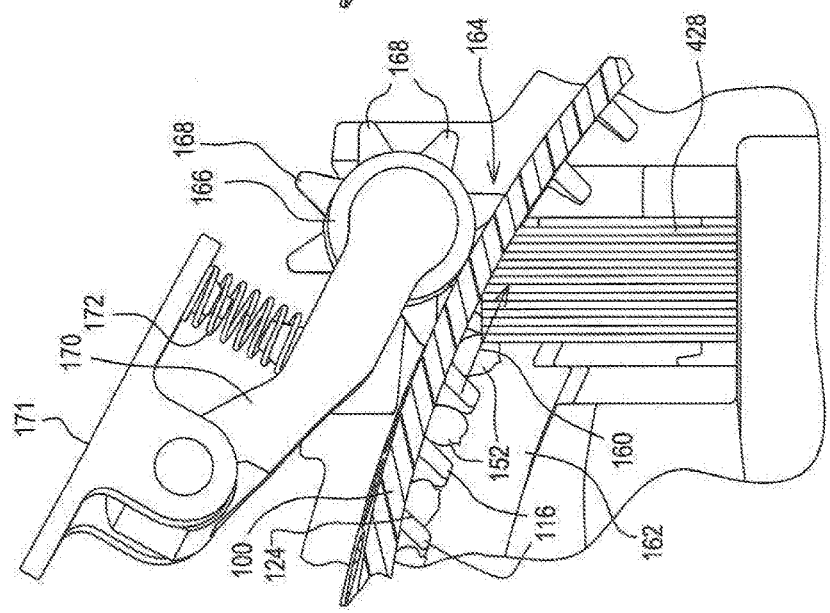

PLANTING UNIT FOR A SEEDING MACHINE HAVING A SEED METER AND SEED DELIVERY SYSTEM

CROSS REFERENCE TO RELATED APPLICATION

This application is a Continuation of application Ser. No. 14/505,829, filed 3 Oct. 2014 which is a Continuation of application Ser. No. 13/072,051, filed 25 Mar. 2011, now U.S. Pat. No. 8,850,998.

FIELD

The following relates to a planting unit for a seeding machine and more particularly to a planting unit having a seed meter and seed delivery system.

BACKGROUND

Various types of seed meters have been developed that use an air pressure differential, either vacuum or positive pressure, to adhere seed to a metering member. The metering member takes seed from a seed pool and sequentially discharges single seeds. (In some cases, multiple seeds may be discharged at a time.) One common type of seed meter is shown in U.S. Pat. No. 5,170,909. There, a seed disk 48 contained in a housing is used to meter the seed. The seed pool is positioned on one side of the disk at a lower portion thereof while vacuum is applied to the opposite side of the disk. As the disk is rotated, individual seeds from the seed pool are adhered by the vacuum to apertures that extend though the disk. When the seed reaches a desired release position, the vacuum is terminated, allowing the seed to drop from the disk, through a seed tube to a furrow formed in the soil below.

Flexible belts have also been used in an air pressure differential seed meter. One example is shown in US patent application 2010/0192818 A1. There, a flexible belt having an array of apertures therein is movable along a path in a housing. A seed pool is formed on one side of the belt. Vacuum applied on the opposite side of the belt along a portion of the belt path adheres seed to the apertures, allowing the belt to move the seed to a release position where the vacuum is cut-off. The seed then falls or is removed from the belt.

When seed falls by gravity from the meter through the seed tube, it can be difficult to maintain accurate and consistent seed spacing at planting speeds greater than about 8 kph (5 mph). To maintain spacing accuracy, a seed delivery system that controls the seed as the seed moves from the seed meter to the soil is desirable. One such delivery system is shown in US patent application 2010/0192819-A1. With such a delivery system, the hand-off of seed from the disk of U.S. Pat. No. 5,170,909 to the delivery system is difficult to achieve in a consistent manner. While the hand-off of seed may be improved with the use of a belt meter, there is still a need for a more consistent and reliable hand-off of seed from the seed meter to the delivery system. Improvements to the seed meter and seed delivery system can improve the hand-off of seed to the delivery system.

SUMMARY

In one form, a planting unit for a seeding machine is provided having a planting unit frame member and a seed meter mounted to the planting unit frame member. The seed meter has a housing and a metering member rotatably mounted inside the housing. The metering member further having a sidewall with an inner surface and an outer surface and the sidewall having a rim portion adjacent an outer edge of the sidewall. The inner surface of the side wall and the housing form a trough at a bottom portion of the metering member to hold a seed pool. The inner surface of the sidewall of the metering member at the trough is oriented at an angle between 20° and 75° relative to a vertical vector pointing upward at the outer edge of the sidewall.

In another form, a planting unit for a seeding machine is provided having a seed meter with a metering member mounted for rotation. The metering member has a sidewall extending to an outer edge with the sidewall having inner and outer surfaces and a rim portion of the sidewall adjacent the outer edge having apertures extending through the sidewall. The metering member is adapted to adhere seed to the apertures to sequentially move seed to a release position. The planting unit further has a mechanical seed delivery system adapted to take seed from the metering member at the release position and sweep seed across the inner surface of the sidewall in a direction substantially cross-wise to a direction of travel of the seed on the metering member as the metering member rotates. The seed delivery system then moves seed to a discharge location adjacent a seed furrow formed in soil beneath the seeding machine.

BRIEF DESCRIPTION OF THE DRAWINGS

FIG. 7 is side cross-section of the metering member of FIG. 6 illustrating the orientation of the metering member installed in a seed meter mounted to a planting unit;

FIG. 8 is a fragmentary cross-section of an alternative metering member;

FIG. 11 is a sectional view of the hand-off of seed from the metering member to the delivery system including the delivery system brush belt;

FIG. 12 is a sectional view like FIG. 11 without the delivery system brush belt;

FIG. 13 is a schematic illustration the direction of entry of seed into the brush belt;

FIG. 14 is a schematic illustration of the direction of travel of the seed on the metering member and in the delivery system at the release position of seed from the metering member;

DETAILED DESCRIPTION

Figure 1:
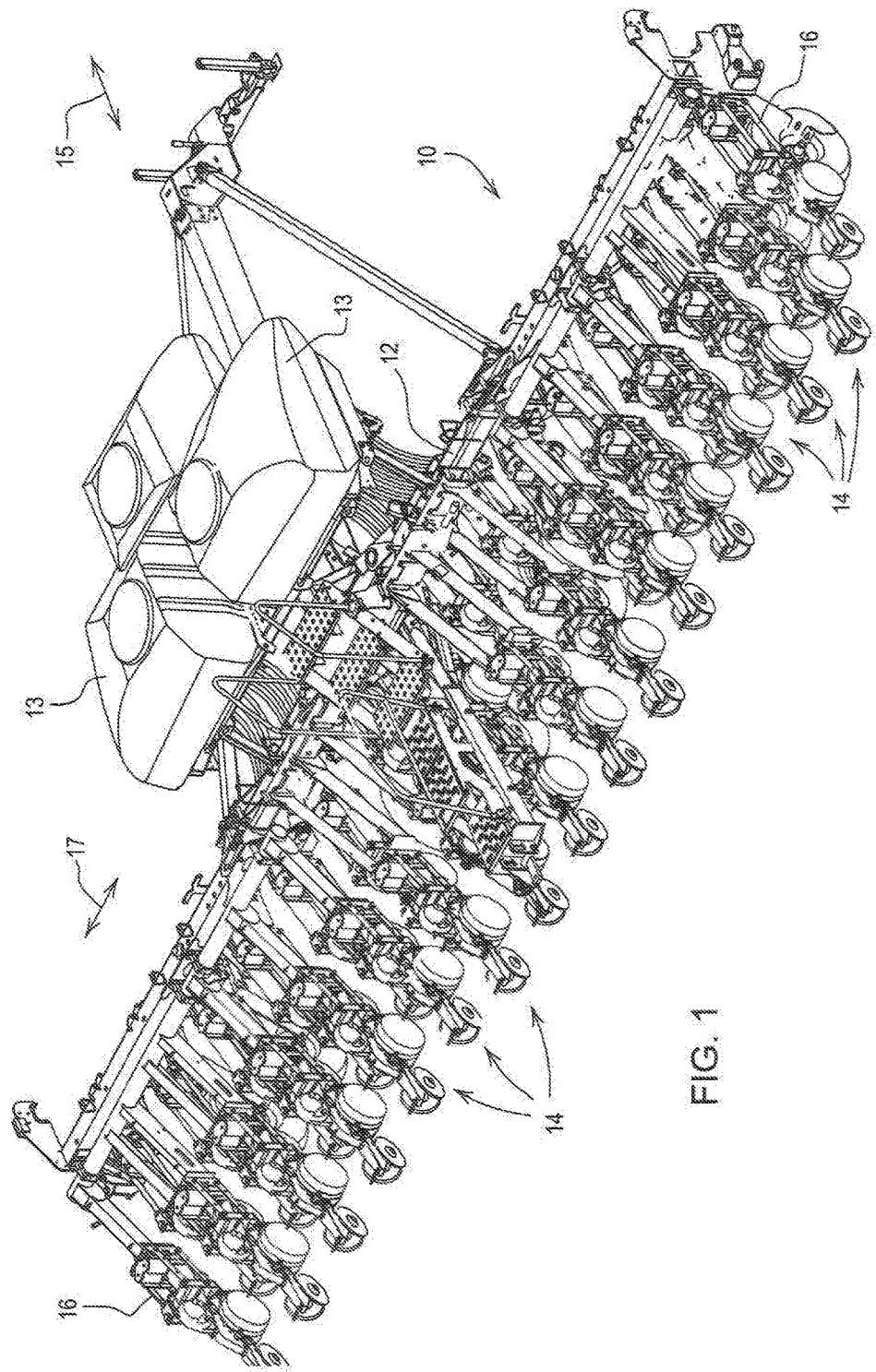
FIG. 1 is a perspective view of a common agricultural planter.
Figure 2:
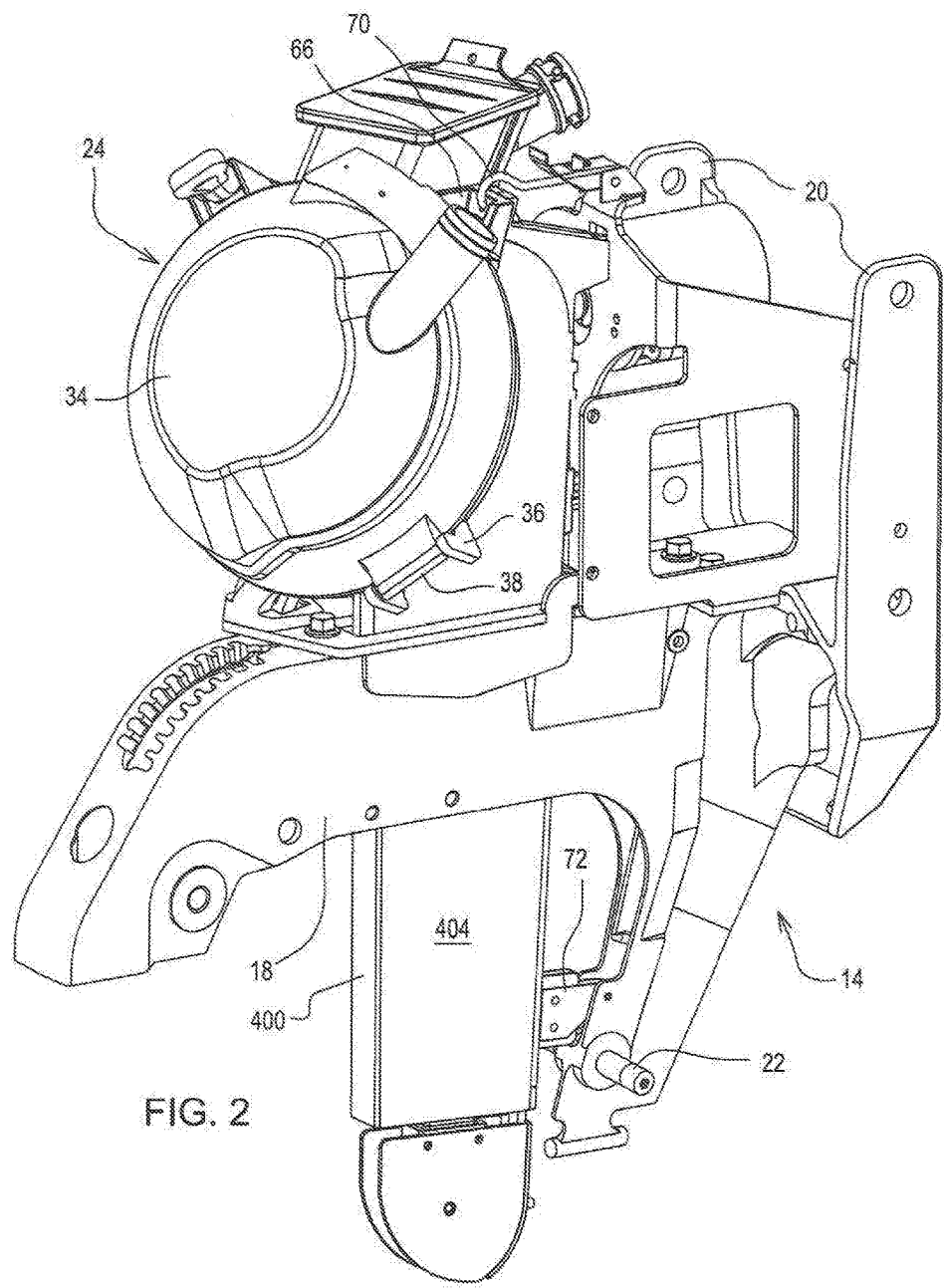
FIG. 2 is a side perspective view of a planting unit frame, seed meter and seed delivery system.

An agricultural seeding machine 10 is shown in FIG. 1 as a row crop planter. Seeding machine 10 has a central frame 12 on which are mounted a plurality of individual planting units 14. The seeding machine 10 has a fore-aft direction shown by the arrow 15 and a transverse direction shown by the arrow 17. Each planting unit 14 is coupled to the central frame 12 by a parallel linkage 16 so that the individual planting units 14 may move up and down to a limited degree relative to the frame 12. Large storage tanks 13 hold seed that is delivered pneumatically to a mini-hopper on each planting unit. Each planting unit 14 has a frame member 18 (FIG. 2) to which the components of the planting unit are mounted. The frame member 18 includes a pair of upstanding arms 20 at the forward end of thereof. The arms 20 are coupled to the rearward ends of the parallel linkage 16. Furrow opening disks (not shown) are attached to shaft 22 in a known manner to form an open furrow in the soil beneath the seeding machine into which seed is deposited. Closing and packing wheels (not shown) are also mounted to the frame member 18 in a known manner to close the furrow over the deposited seed and to firm the soil in the closed furrow. A seed meter 24 and a seed delivery system 400 are also attached to the frame member 18 of the planting unit.

The meter 24 includes a housing 30 (FIG. 3) and a cover member 34. The housing 30 and the cover member 34 are coupled to one another by complementary hinge features 36 and 38 (see FIG. 5) on the housing and cover member respectively. Hinge feature 36 includes a pivot pin 37 coupled to the housing while the feature 38 is an integrally formed hook that wraps around the pivot pin allowing the cover member 34 to pivot about the axis of the pin 37. An elastomeric latch member 40 is coupled to the housing 30 and has an enlarged portion 42 that is seated into a socket 44 formed in the cover member to hold the cover member in a closed position on the housing 30.

Figure 3:
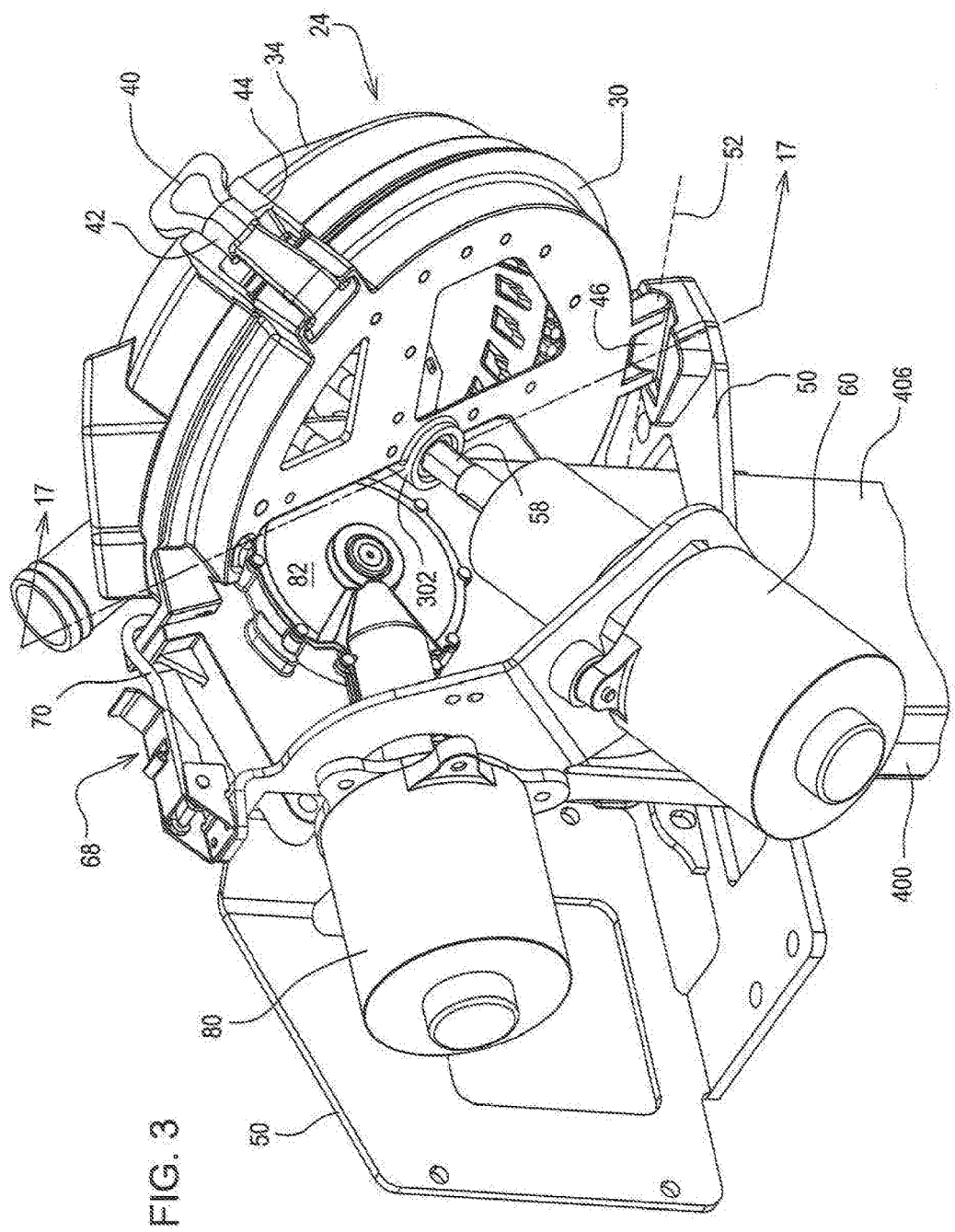
FIG. 3 is an enlarged perspective view of the seed meter and delivery system drives.
Figure 4:
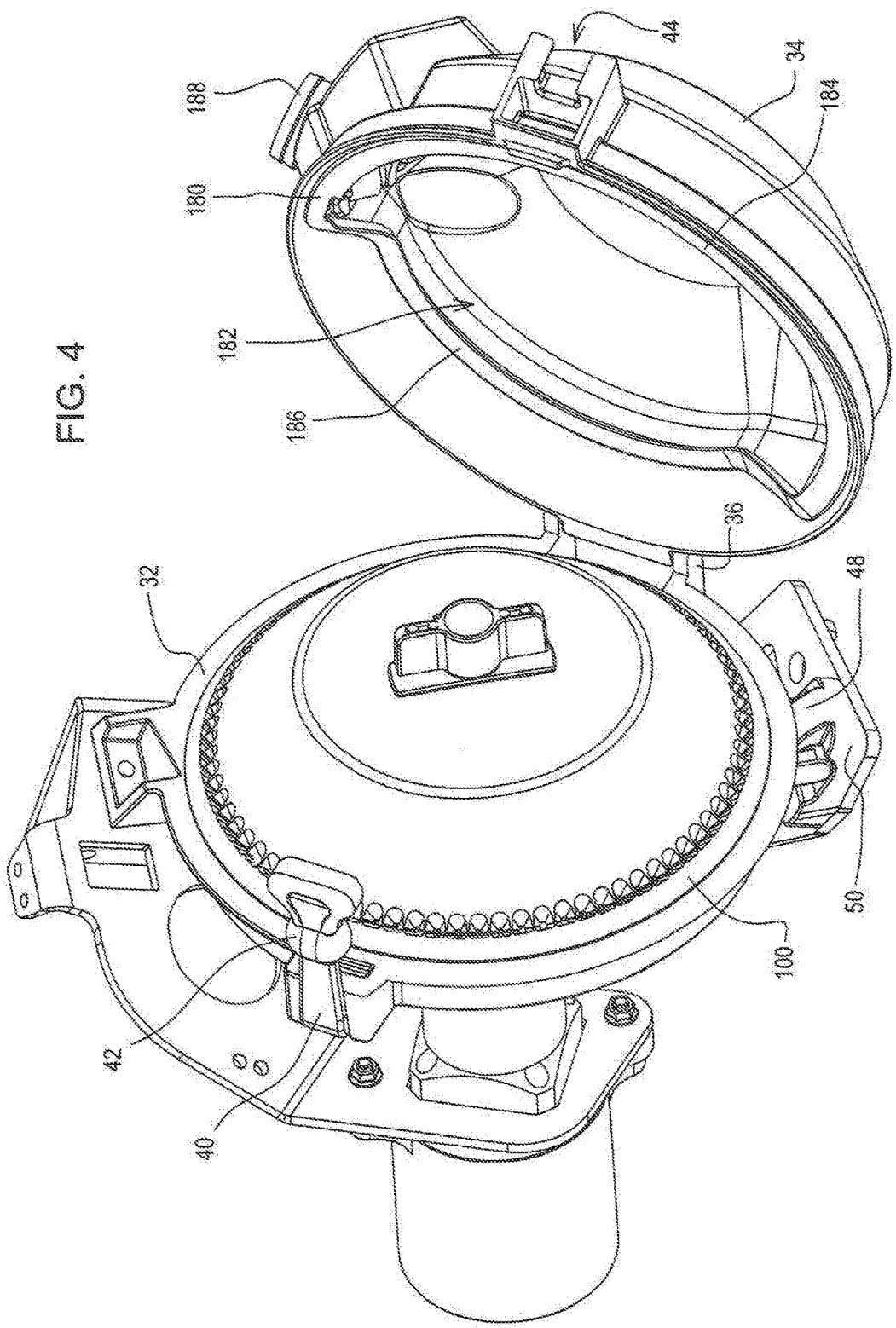
FIG. 4 is a perspective view of the seed meter with the cover open illustrating the metering member.

The housing 30 is formed with a second hinge element in the form of a pivot pin 46 (FIG. 3). Pivot pin 46 is seated into a hook member 48 (FIG. 4) of the mounting frame 50 attached to the frame member 18. This allows the seed meter 24 to pivot relative to the planting unit frame member 18 about an axis 52. A drive spindle 54 is carried by the housing 30 and has a drive hub 56 (FIG. 5) on the end thereof. The spindle 54 couples to the output shaft 58 of electric motor 60 to drive the seed meter when in the assembled position shown in FIG. 3. The seed meter 24 is coupled to the delivery system by a latch mechanism 68 including a metal rod 70 having a hook at one end seated into an aperture in the meter housing 30 when latched. The delivery system further has a mounting hook 72, partially shown in FIG. 2, which attaches to the planting unit frame member 18 to support the delivery system.

The delivery system 400 is driven by an electric motor 80, also carried by the mounting frame 50. The output shaft of motor 80 is connected to the delivery system through a right-angle drive 82. While electric motors have been shown to drive both the seed meter and the seed delivery system, it will be appreciated by those skilled in the art that other types of motors, such as hydraulic, pneumatic, etc. can be used as well as various types of mechanical drive systems.

Figure 6:
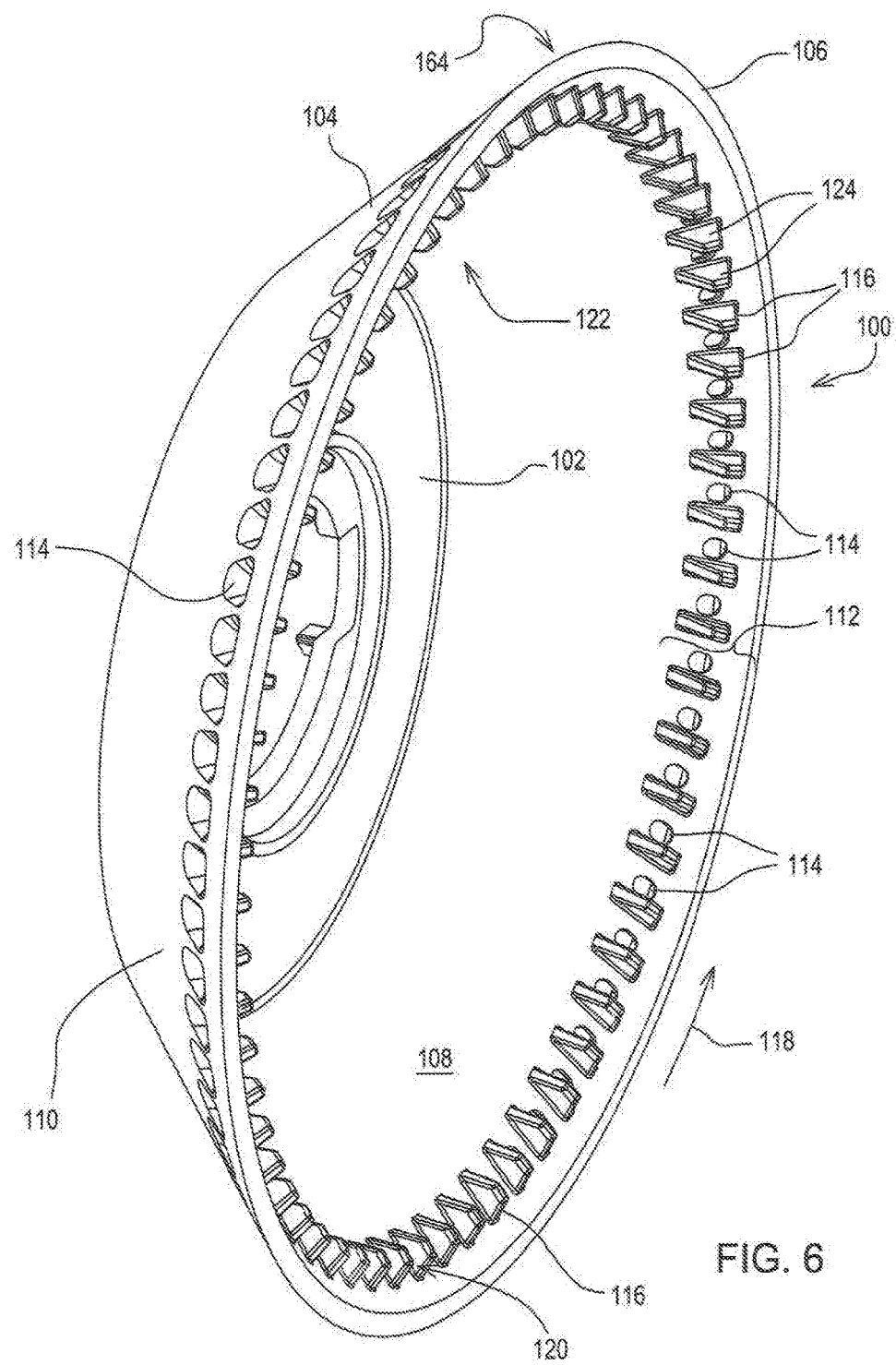
FIG. 6 is a perspective view of the metering member of FIG. 4.

With reference to FIG. 6, a metering member 100 of the seed meter is shown in greater detail. These metering member 100 is shown as a single piece, concave bowl shaped body. The bowl shaped body has a base portion 102 from which extends a sidewall 104. Sidewall 104 terminates in an outer edge 106. The sidewall has a radially inner surface 108 and a radially outer surface 110. Adjacent the outer edge 106, the sidewall has a rim portion 112 shown by the bracket in FIG. 6. The rim portion 112 extends radially outwardly and axially toward the outer edge 106. In the rim portion 112, there is an annular array of apertures 114 that extend through the sidewall between the inner and outer surfaces 108 and 110. The metering member 100 is mounted in the meter housing for rotation in the direction of the arrow 118 in FIG. 6. In operation, as the metering member rotates, individual seeds from a seed pool 120 located at a bottom portion of the metering member are adhered to the apertures 114 on the inner surface 108 of the sidewall and sequentially carried upward to a release position 164 at an upper portion of the metering member. Thus, the inner surface is also known as the seed side of the metering member. A series of raised features or projections, such as paddles 116, extend from the inner surface 108 of the sidewall 104 typically with one paddle located behind each aperture 114 in the direction of rotation. Each paddle forms a confronting surface 124 behind the associated aperture in the direction of rotation to push the seed adhered to the aperture into the delivery system as described below. As explained above, it is the rim portion 112 of the metering member that performs the function of drawing individual seeds from the seed pool and sequentially moving seed to the release position to supply seed individually to the seed delivery system 400.

The base portion 102 of the metering member contains a central drive aperture 130 (FIG. 5) used to mount the metering member on a rotational drive hub 56 for rotation about the axis 132 in a manner similar to mounting a flat seed disk in a seed meter as is well known. When mounted to the housing 30, the metering member 100 cooperates with the housing to form a trough to hold the seed pool 120 as described more fully below. The axis 132 is inclined to both a horizontal plane as well as to a vertical plane extending fore and aft of the seeding machine and a vertical plane extending transversely to the seeding machine.

With reference to FIG. 7, the metering member 100 is shown in a sectional view. The base portion 102 is a generally planar while the rim portion 112 of the inner surface of the sidewall 104 is outwardly flared, that is, extending both radially outward and axially. As shown in FIG. 7, the rim portion is frusto-conical. Alternatively, as shown in FIG. 8 in connection with a metering member sidewall 104', the inner surface of the sidewall rim portion 112 may be frusto-spherical in shape. Furthermore, while the rim portion 112 has been shown as being outwardly flared, the rim portion could be generally cylindrical without any outward flair, that is, extending only axially.

The metering member 100 can be formed as one piece or constructed of multiple pieces. The metering member can be most easily molded of plastic such as polycarbonate, nylon, polypropylene or urethane. However, other plastics can be used as well as other materials such as metal, etc. The metering member 100 is sufficiently rigid to be self-sustaining in shape without additional supporting structure. This is in contrast to the flexible belt metering member shown in U.S. Pat. No. 2,960,258 where it be belt member is preferably of a flexible elastomeric material and is supported within a support ring. Being self-sustaining in shape, the metering member does not need any supporting structure to hold a shape. As a self-sustaining, the metering member may be rigid or the metering member may be flexible to change shape when acted upon in a manner similar to the flexible seed disk of U.S. Pat. No. 7,661,377.

As previously mentioned, the metering member 100 can be mounted to a drive hub through the central drive aperture 130 in the base portion 102. Mounting through the central drive aperture 130 provides both mounting support of the metering member as well as the rotational drive of the metering member. Alternatively, support for the metering member can be provided on the outer surface of the sidewall. A groove may be formed in the outer surface of the sidewall to receive rollers that support the metering member. If the groove is also formed with drive teeth, one of the rollers could be driven by a motor to rotate the metering member. With such alternative arrangements possible, it is not necessary that the metering member have a base portion. The function of metering seed is performed by the sidewall and thus, the sidewall is the only required portion of the metering member.

As shown in FIG. 7, the metering member 100, when mounted in the meter housing, is oriented at an incline to the vertical as shown. In this orientation, the apertures 114 lie in a plane 150 inclined at an angle α relative to vertical. In this orientation, an upper portion 148 of the metering member overhangs or extends beyond a lower portion 154. As described below, this allows access to the upper portion 148 of the metering member for the mechanical seed delivery system 400. As shown, the angle α is approximately 24°. However, any angle will suffice as long as the upper portion 148 extends beyond the lower portion sufficiently for access for the seed delivery system from below the metering member at the seed release position.

Figure 9:
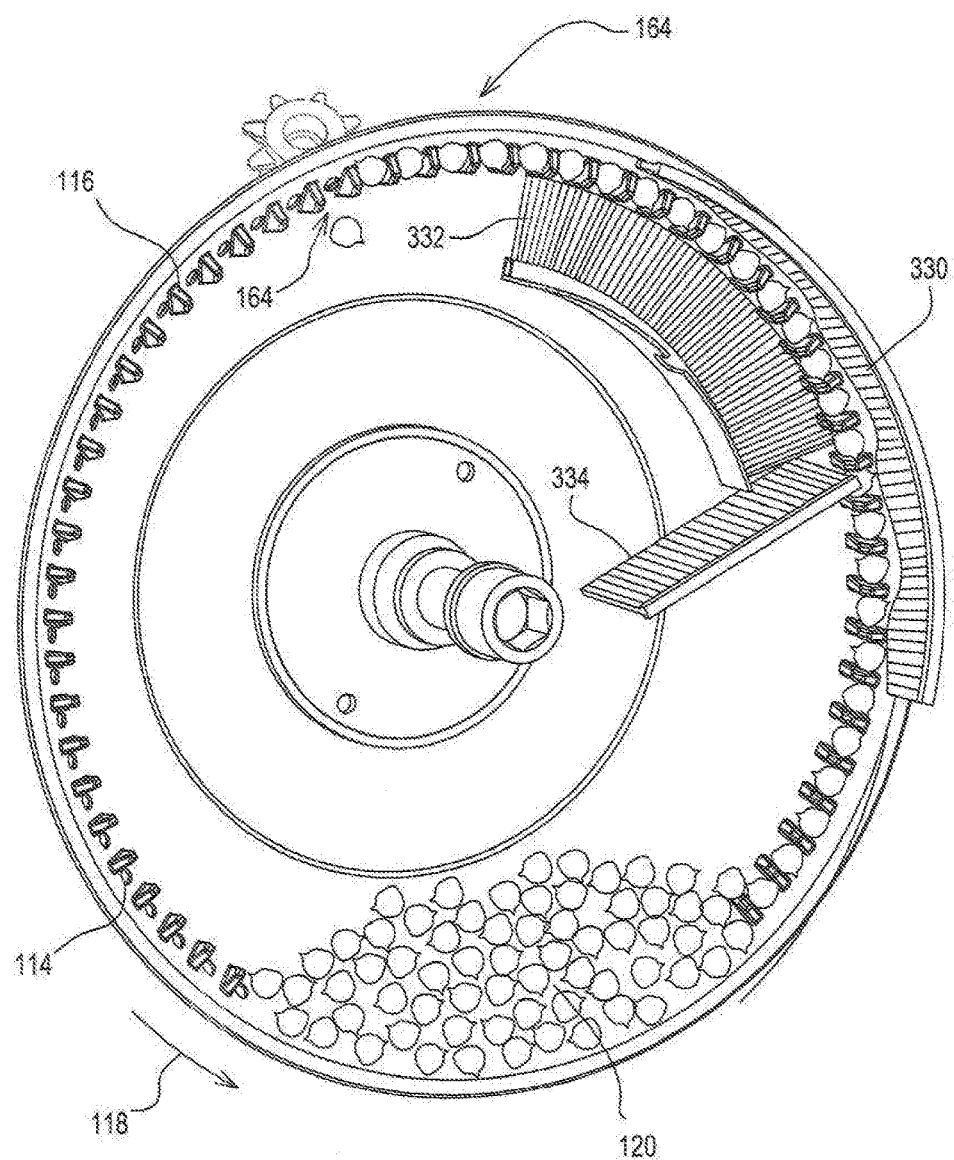
FIG. 9 is a elevational view of the inside of the metering member of FIG. 6.

The seed pool 120 is formed at the bottom of the metering member 100 as shown in FIG. 9. Vacuum is applied to the outer surface 110, causing individual seeds to be adhered to the apertures 114 as the apertures travel through the seed pool. As the metering member rotates as shown by the arrow 118, seed is moved upward to a release position 164 at the upper portion 148 of the metering member. The release position is slightly past the top or 12 O'clock position on the circular path of travel of the seed such that the seed is moving somewhat downward at the release position. This facilitates the seed's entry into the delivery system as more fully described below. Also, by being past the top point of the path, the delivery system is off center relative to the metering member providing clearance between the delivery system and the seed meter drive. At the release position 164, the inner surface of the rim portion of the metering member is facing downward such that seed is adhered beneath the metering member or is hanging from the metering member. See FIG. 10. The seed delivery system 400 is also positioned beneath the upper portion of the metering member at the release position 164 to take the seed from the metering member as shown in FIG. 10.

Delivery system 400 includes a housing 402 having a left sidewall 404 (see FIG. 19) and a right sidewall 406 (see FIG. 3). The terms left and right are used in relationship to the direction of travel of the seeding machine shown by the arrow 408. Connecting the left and right sidewalls to one another is an edge wall 410. An upper opening 416 is formed in the edge wall and sidewalls to allow seed to enter into the housing 402. A lower opening 418 is provided at the lower end forming a discharge location 413 for the seed. A pair of pulleys 420 and 422 are mounted inside the housing 402. The pulleys a support a belt 424 for rotation within the housing. One of the two pulleys is a drive pulley while the other pulley is an idler pulley. The belt has a flexible base member 426 to engage the pulleys. Elongated bristles 428 extend from the base member 426. The bristles are joined to the base member at proximal, or radially inner, ends of the bristles. Distal, or radially outer, ends 430 of the bristles touch or are close to touching the inner surface of the housing edge wall 410.

Figure 10:
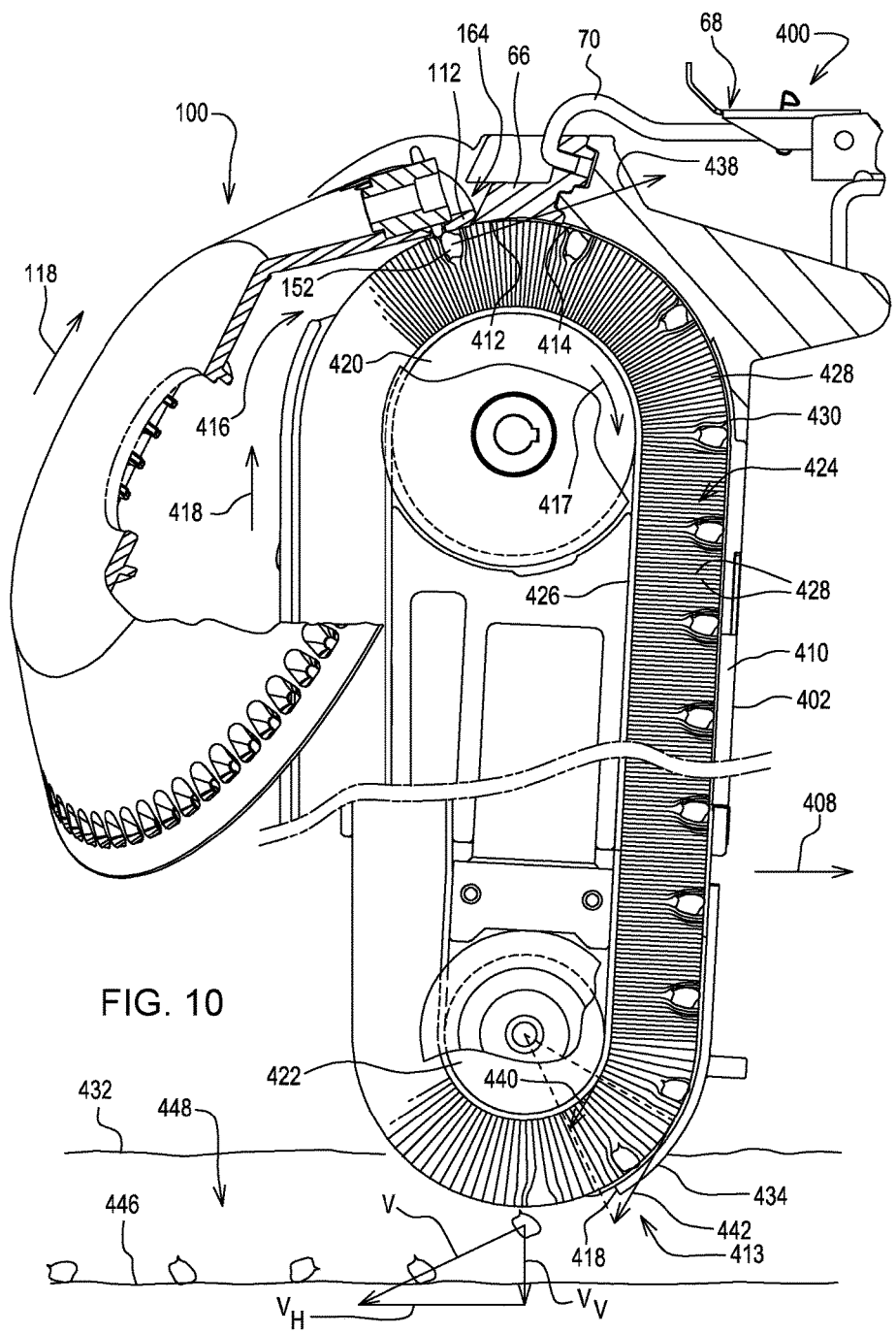
FIG. 10 is a side sectional view of the metering member and seed delivery system.

As shown at the top of FIG. 10, a seed 152 is at the release position on the metering member 100 and has just been inserted into the bristles 428 of the delivery system. At the release position, the rim portion 112 of the metering member sidewall 104 is generally tangent to the stationary inner surface 412 across which the brush bristles 428 sweep. The surface 412 is on a latch portion 66 of the housing 30. The surface 412 is a continuation of the inner surface 414 of the delivery system housing 402. Once the seed is captured in the delivery system, the seed moves in the direction of the belt, shown by the arrow 417. The direction of travel of the seed immediately upon capture by the delivery system 400 is shown by the vector 438.

Prior to release of the seed from the metering member, the seed is moving in the direction of vector 160 which is slightly downward into the bristles 428. With reference to FIG. 13, the vector 160 of the seed direction is at an angle 161 of about 60° to the length of the bristles 428 shown by the arrow 176. As shown in FIG. 11, the brush belt is positioned so that seed enters the bristles at the corner of the brush belt. The brush can be positioned so that the seed enters the brush through the distal ends of the bristles or through the side of the bristles.

The relationship between the seed direction vector 160 on the metering member and the seed direction vector 438 when the seed is first in the brush belt is shown in FIG. 14 illustrating the two vectors in the plane containing both vectors at the release position 164. The angle 163 between the vectors is at least 35° and preferably between 50° and 80°. This shows the cross-feed of the seed into the bristles, meaning that the seed, prior to the release position is moving substantially in a different direction than the brush bristles are moving. This is in contrast to the arrangement shown in FIG. 3 of the previously mentioned US patent application 2010/0192819-A1 where the seed on the metering disk at the release is moving in substantially the same direction as the brush bristles. This is also the relationship by which the bristles sweep over the inner surface of the sidewall relative to the travel direction of seed.

Figure 15:
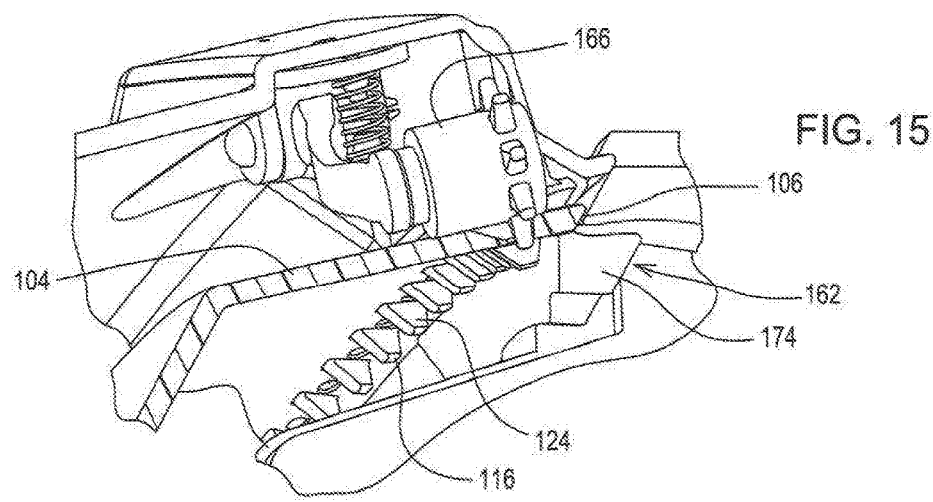
FIG. 15 is side sectional view of the metering member and delivery system at the hand-off without the brush belt.

FIGS. 11 and 12 show a blocking member 162 carried by the meter housing 30. Blocking member 162 is positioned adjacent a path of travel of seed 152 leading to the release position 164 and prevents movement of seed from the metering member prior to reaching the release position. Once the seed has passed the end 174 of the blocking member 162, the seed is free to move with the brush bristles in the direction of the vector 438 in FIG. 10. The blocking member ensures that the seed is consistently feed into the brush belt in the center of the belt, widthwise, rather than allowing the seed to enter the belt at random positions across the belt width. As shown in FIG. 15, the blocking member is located beneath the sidewall 104 of the metering member 100 between the paddles 116 and the outer edge 106 of the metering member. The confronting surfaces 124 of the paddles 116 push seed into the brush bristles. The paddles or projections 116 travel further into the brush bristles as the projections cross the width of the brush as seen in FIG. 11. Once seed is in the brush bristles, the seed is swept over the inner surface of the metering member, from the apertures 114 to the outer edge 106 of the metering member in the direction of the vector 438. The delivery system could be arranged to sweep seed in the opposite direction, that is, away from the outer edge 106 of the metering member.

To further ensure consistent release of seed from the metering member and hand-off to the delivery system, an ejector 166, carried by the cover member 34 rides on the outer surface of the metering member rim portion. See FIGS. 11, 12 and 15. The ejector 166 is in the form of a star wheel having a number of projections 168. The projections 168 extend into the apertures 114 from the outer surface 110 of the sidewall 104 and force seed out of the apertures 114. The ejector is caused to rotate by rotation of the metering member 100 due to the projections 168 engaging in the apertures 114. The ejector is mounted to the cover member 34 via a pivot arm 170 and bracket 171. The ejector 166 is biased against the metering member by a spring 172.

Turning attention once again to FIG. 4, a flexible seal 180 is shown on the inner side of the cover member 34. This seal bears against the outer surface 110 of the metering member 100 forming a vacuum chamber within the interior 182 of the seal. A first portion 184 of the seal is spaced radially further out on the metering member than is the second portion 186 of the seal. In the area of the seal first portion 184, vacuum is applied to the apertures 114, causing seed to adhered thereto. There is no vacuum applied to the apertures adjacent and outside of the seal second portion 186. A port 188 in the cover member 34 is adapted to connect the interior of the cover member to a vacuum source in a known manner for a vacuum seed meter. The seed release position 164 is within the vacuum chamber. Thus, the brush belt and the ejector are working in opposition to the vacuum applied to the apertures 114 to release the seed from the metering member.

Figure 16:
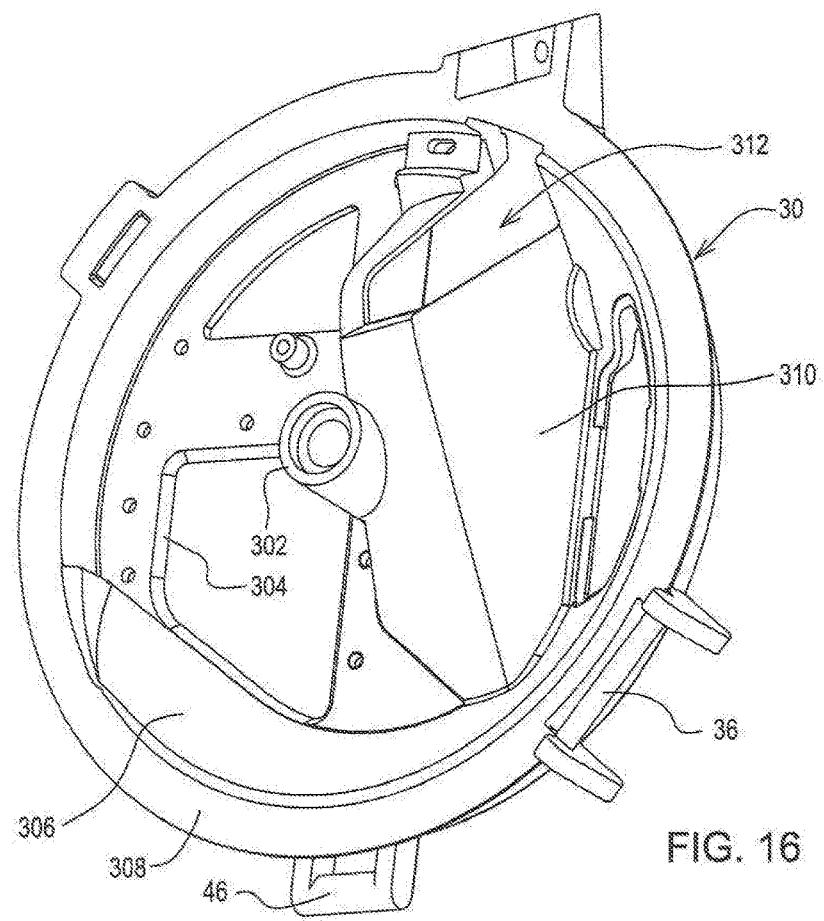
FIG. 16 is a perspective view of the inner side of the seed meter housing.

With reference to FIG. 16, The inside of the housing 30 is shown. The housing includes a central boss 302 for the drive spindle 54. The housing also includes an opening 304 to receive seed from a mini-hopper, not shown, mounted to the outside of the housing and surrounding the opening 304. Below the opening 304, the housing wall forms a ramp 306 extending downward toward the lower end 308 of the housing. The ramp cooperates with the inner surface 108 of the metering member to hold the seed pool 120. The housing includes an inward projection 310 forming a cavity 314 (FIG. 17) on the outside of the housing into which the upper end if the delivery system 400 is placed. The projection is open at the upper end, forming a downward looking opening 312 from the interior of the housing to the exterior. This opening 312 allows the brush belt 424 to access the inner surface of the 108 of the metering member and carry seed from the housing.

Figure 17:
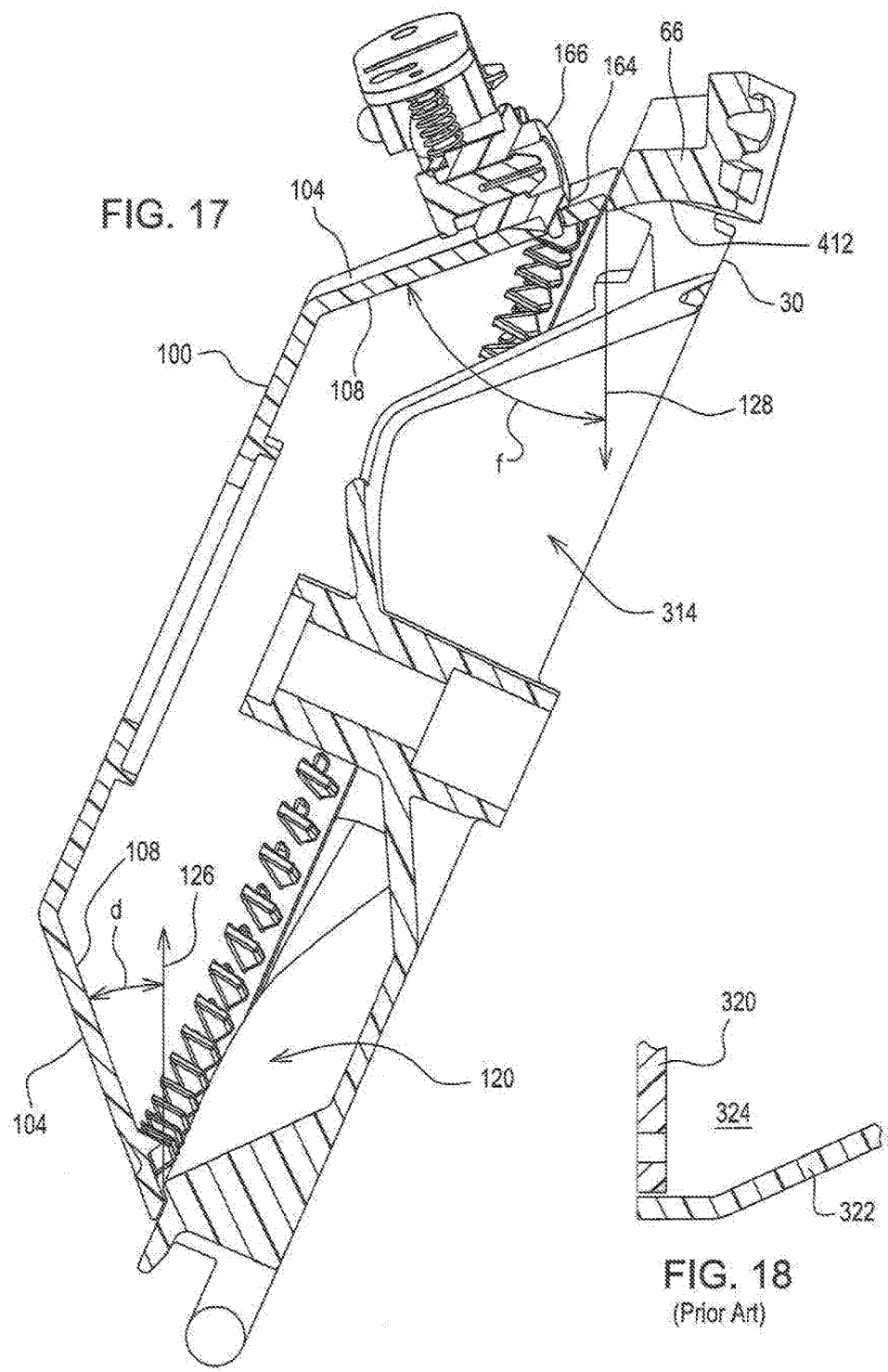
FIG. 17 is a side sectional view of the metering member and meter housing illustrating the seed pool formed by the metering member and housing.
Figure 18:
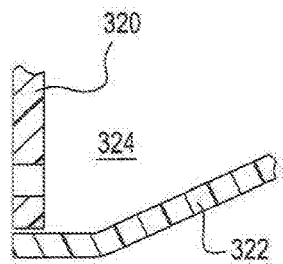
FIG. 18 is side sectional view like FIG. 17 illustrating a prior art seed meter with a disk metering member.

FIG. 17 illustrates the orientation of the metering member and the cooperation of the housing 30 and metering member 100 to form a trough for the seed pool 120 at the lower end of the metering member. FIG. 17 shows the orientation of the metering member when the seeding machine 10 is on level ground. At the lower end of the metering member, the sidewall 104 is inclined to the vertical such that the inner surface 108 is at an angle d to the vertical vector 126. As illustrated in FIG. 17, the inner surface is approximately 21° from vertical. The orientation of the housing adjacent the metering member, forming the other side of the trough, is not critical. Seed from the seed pool 120 sits on top of the inner surface 108 and a component of the force of gravity is perpendicular to the inner surface 108. When operating on a hillside, if the meter is tilted clockwise or counter-clockwise, as viewed in FIG. 17, the inner surface 108 remains inclined and gravity still has a component perpendicular to the inner surface. This is in contrast to a typical disk seed meter shown in FIG. 18 with a vertically oriented disk 320 cooperating with a housing wall 322 for form a seed pool 324. If this meter is tilted counterclockwise as viewed, seed from the pool will still bear against the disk. However, if the meter is tilted clockwise, seed from the pool will fall away from the disk, allowing for decreased metering performance in terms of seed being picked-up by the disk. Evaluation of the meter has shown improved meter performance on a hillside when the angle d is as small as 5° and as large as 75°. Better performance is achieved when the angle d is between 10° and 50° while the optimum performance is in the range of 20° to 40°. This last range provides considerable tilting of the seed meter on a hillside in any direction before performance begins to decrease.

At the upper end of the metering member, at the release position 164, the inner surface 108 has an angle f to a downward vertical vector 128 in the range of 50° to 90° with the closer to 90° being the better for hand-off of seed from the metering member to the brush belt. As shown, the angle f is approximately 68°. The different orientations of the inner surface 108 relative to vertical at the seed trough and at the release position is accomplished with a metering member that is rigid. Such variation is not possible with the flat disk metering member shown in FIG. 18.

As described above, seed is adhered to the apertures 114 in the metering member due to the vacuum applied to the outer surface of the metering member creating a pressure differential on opposite sides of the metering member. As an alternative to vacuum on the outer side of the metering member, the pressure differential can be created by a positive pressure between the housing 30 and the metering member 100. Such a system would require seals between the metering member 100 and the housing 30 to create a positive pressure chamber. In a positive pressure arrangement, the cover member 34 only serves as a cover for the rotating metering member.

Figure 5:
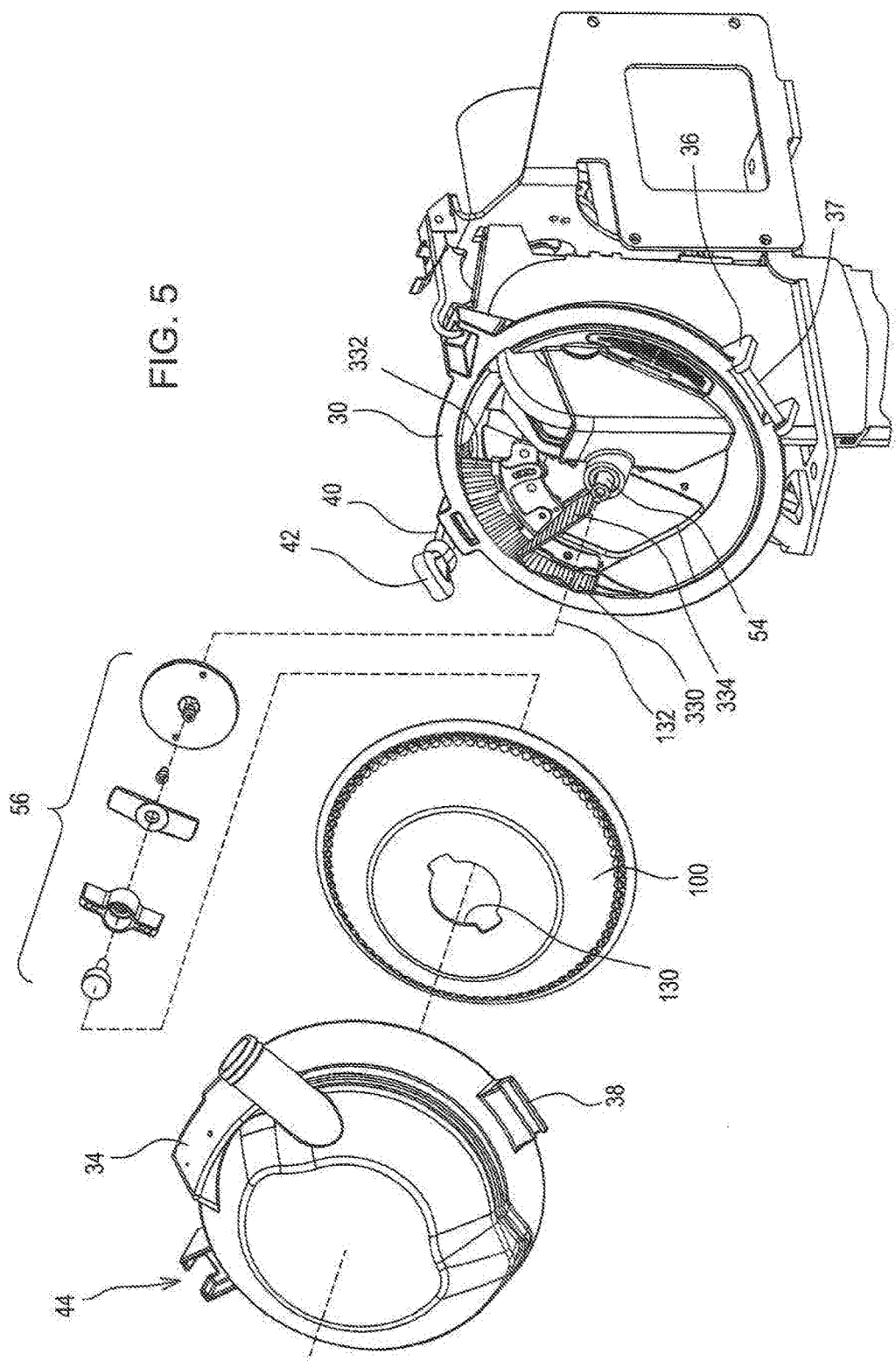
FIG. 5 is an exploded perspective view of the seed meter of FIG. 4.

It is possible that more than one seed will be adhered to a given aperture 114. To prevent more than one seed at a time from being transferred to the brush belt, a pair of doubles eliminators or singulating members are attached to the housing 30 along the path of seed from the seed pool to the release position 164. The singulating members are in the form of brushes 330 and 332 (FIGS. 5 and 9). Brush 330 has bristles extending substantially axially and brushes seed on the apertures 114 by extending inwardly from the outer edge 106 of the metering member. The bristles of brush 330 are of varying length, to engage the seed at several discrete locations along the length of the brush 330. The brush 332 has bristles extending substantially radially and engaging the inner surface of the metering member sidewall inside of the paddles 116 and extend along the sidewall to the apertures 114. Both brushes 330 and 332 act to slightly disturb seed on the aperture and cause excess seed to fall off. Once removed, the excess seed falls back to the seed pool 120. The brushes can be fixed in position or they can be adjustable to change the degree to which the brushed disturb seed on the metering member. A third brush 334 is shown which extends generally radially of the metering member. The brush 334 serves to define an boundary to the seed pool 120. The brushes 330, 332 and 334 are mounted to the housing 30.

Returning again to FIG. 10, once seed is captured or trapped in the bristles 428, the delivery system controls the movement of seed from the seed meter to the discharge location. The seeds are held in the bristles such that the seeds can not move vertically relative to the bristles 428 or relative to other seeds in the delivery system. Particularly, during travel of the seeds along the vertical side of the delivery system, the seeds are held on at least the top and bottom of the seeds to prevent any relative movement between the seed and the brush belt. Thus, the relative position of the seeds to one another is not affected by dynamics of the planting unit while moving across a field. The seed is carried by the bristles from the upper opening 416 to the lower opening 418 with the movement of the seed controlled at all times from the upper opening to the lower opening.

The lower opening 418 of the delivery system housing is positioned as close to the bottom 446 of the seed trench or furrow 448 as possible. As shown, the lower opening 418 is near or below the soil surface 432 adjacent the seed furrow. The bottom of the delivery system should be no more than one or two inches, (2.5-5 cm) above the soil surface 432. If possible, the lower end of the delivery system should be below the soil surface 432. The housing edge wall 410 forms an exit ramp 434 at the lower opening 418. The lower opening 418 and the ramp 434 are positioned along the curve in the belt path around the pulley 422. The seed, being carried by the bristle's distal ends, increases in linear speed around the pulley 422 as the distal ends of the bristles travel a greater distance around the pulley 422 than does the base member 426 of the belt. This speed difference is shown by the two arrows 440 and 442.

At discharge, the seed has a velocity shown by the vector V. This velocity has a vertical component $V_V$ and a horizontal component $V_H$. The belt is operated at a speed to produce a horizontal velocity component $V_H$ that is approximately equal to, but in the opposite direction of, the seeding machine forward velocity shown by arrow 408. As a result, the horizontal velocity of the seed relative to the ground is zero or approximately zero. This minimizes rolling of the seed in the seed trench.

Seed can be inserted into the brush bristles at essentially an infinite number of positions. This enables the brush to be operated at the speed necessary to produce the desired horizontal velocity component to the seed, independent of the seed population. The seed meter, on the other hand, must be operated at a speed that is a function of both the forward travel speed of the seeding machine and the desired seed population. Because the belt 424 can be loaded with seed at essentially an infinite number of positions, the belt speed can be operated independently of the seed meter speed. This is not the case with other seed delivery systems, such as that disclosed in U.S. Pat. No. 6,681,706 where the delivery system of FIG. 2 has a belt with flights to carry the seed. The belt speed must be timed to the seed meter speed to ensure that one or more flights pass the seed meter for each seed that is discharged from the meter.

While it is desirable to match the seed rearward velocity to the seeding machine forward velocity to minimize seed relative velocity to the soil, with some seed types, it may be necessary to operate the brush belt at a different speed to ensure the seed is discharged from the brush bristles.

Figure 19:
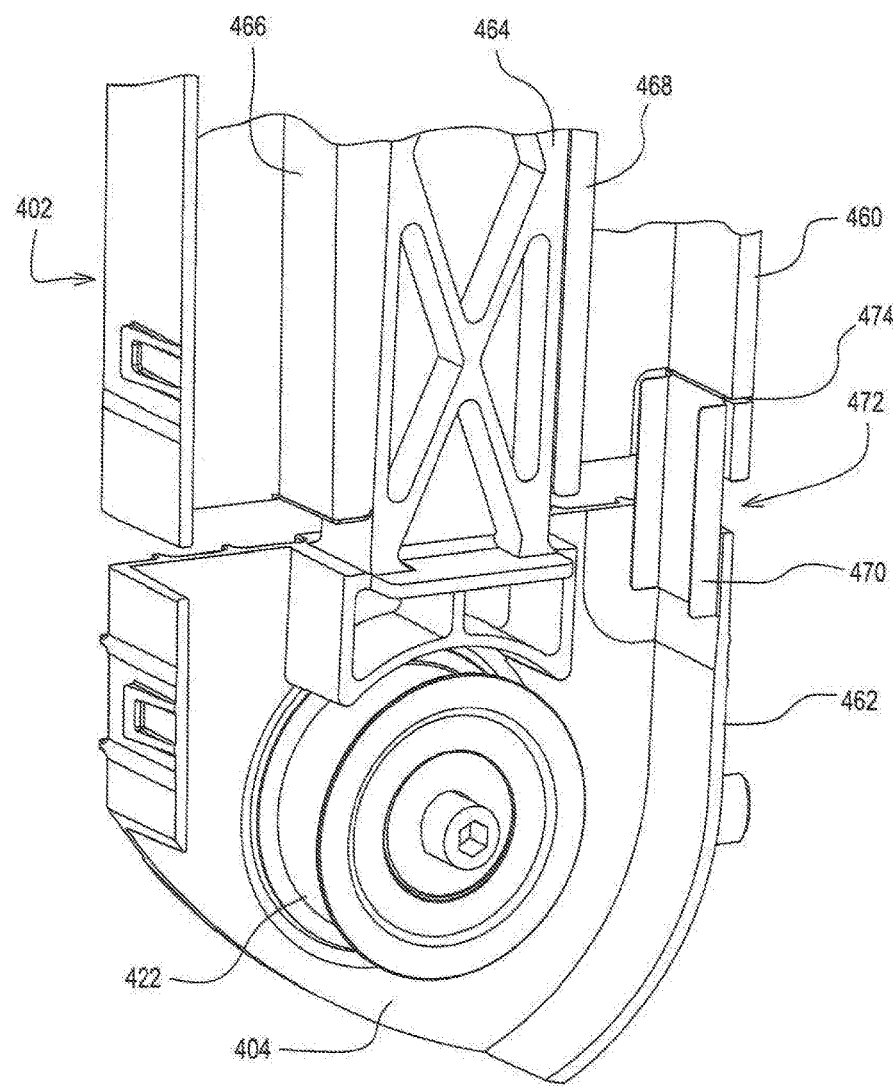
FIG. 19 is a perspective view of the lower end of the delivery system.

The interior of the lower portion of delivery system housing is shown in FIG. 19. The delivery system housing 402 is a two-piece housing having an upper housing member 460 and a lower housing member 462. The lower housing member carries the lower pulley 422. The lower housing member has an upwardly extending rod portion 464 that slides within a channel formed by walls 466 and 468 in the upper housing member. Springs, not shown, push downward on the rod portion 464 to bias the lower housing member downward. The brush belt 424, wrapped about the pulleys 420 and 422, holds the upper and lower housing members together. The belt 424 is tensioned by the springs acting on the rod portion 464. A U-shaped metal strip 470 is attached to the upper housing member 460 and bridges the gap 472 between the upper and lower housing members to provide a continuous surface for holding seed in the housing between the upper opening 416 and the lower opening 418. The metal strip has a tab at the upper end thereof bent over and inserted into a slot 474 in the upper housing member 460 to hold the metal strip 470 in place. If needed, a fastener, such as a nut and bolt, may be placed through the rod portion 464 and the upper housing member 460 to fix the upper and lower housing members together.

Figure 20:
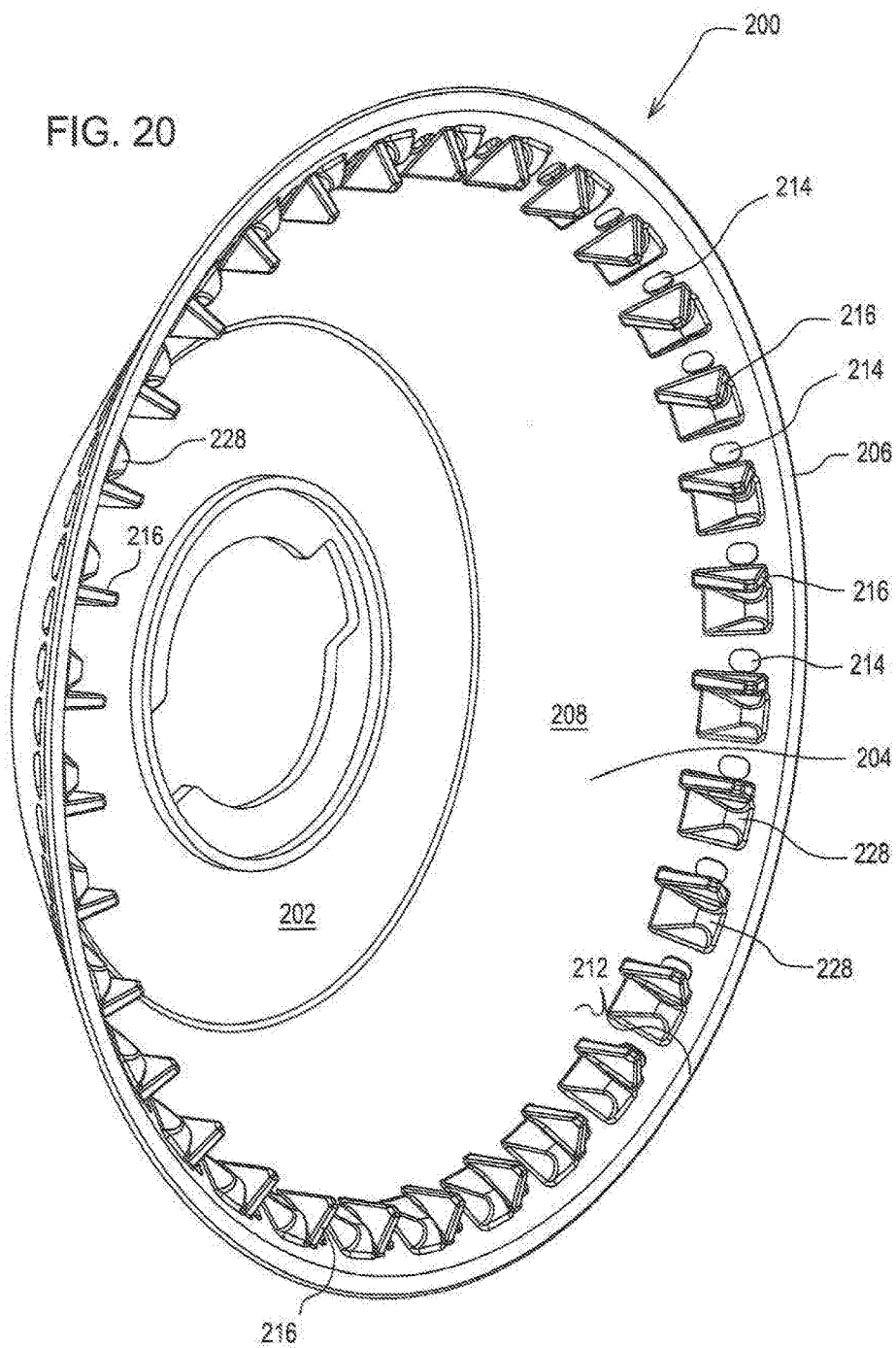
FIGS. 20 and 21 are perspective views of an alternative metering member.
Figure 21:
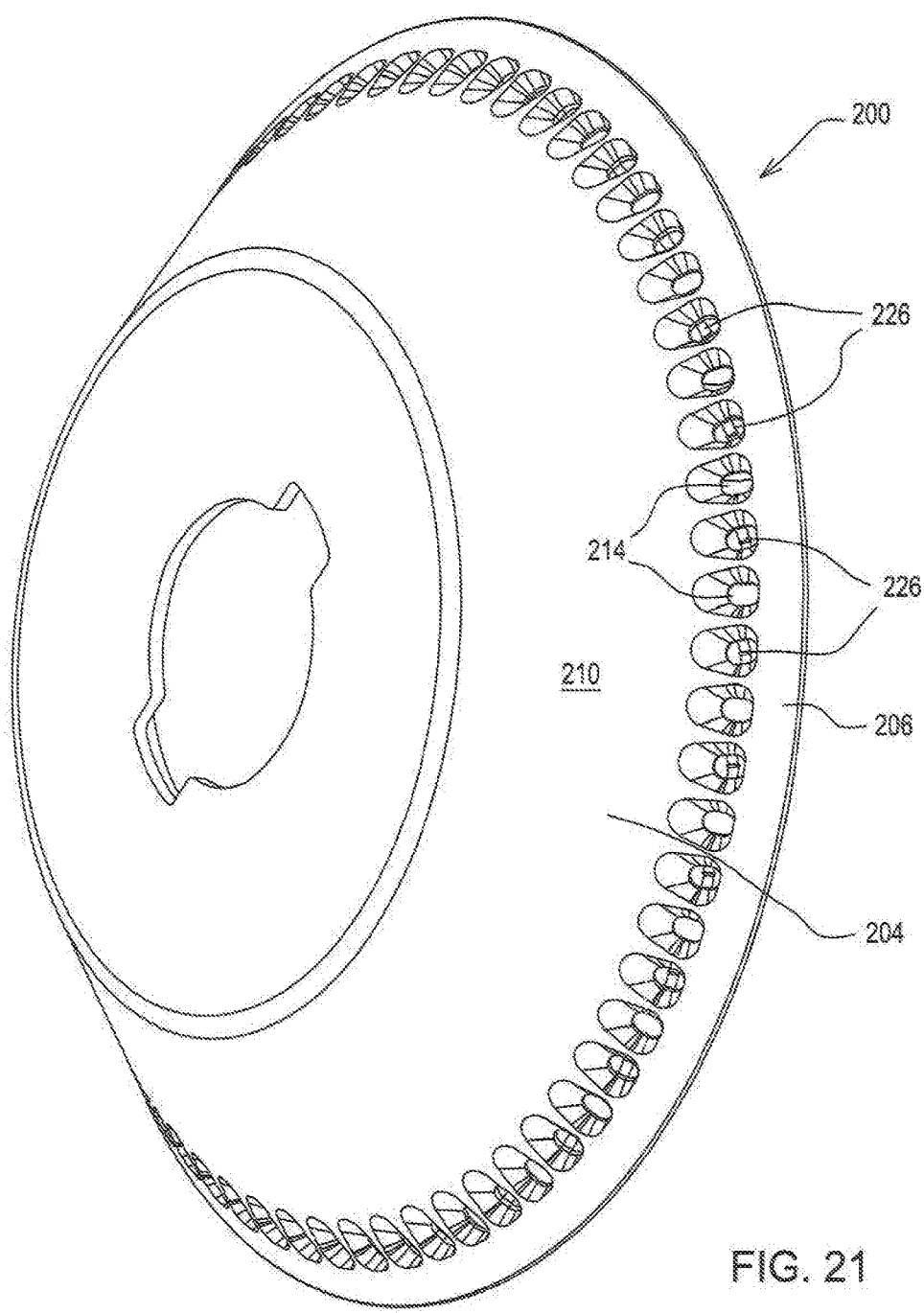

Different metering members may be used for different seed types. The metering member 100 is intended for soybeans and other crops planted with a fairly close seed spacing. Corn, which is planted at a greater seed spacing uses a metering member 200 shown in FIGS. 20 and 21. Metering member 200 is constructed in a similar fashion as metering member 100 and like components are given the same reference numeral with the addition of 100. However, metering member 200 has half the number of apertures 214 as the metering member 100. To avoid the need to replace the ejector 166 when changing metering members, the metering member 200 has recess 226 extending into the sidewall 204 on the outer surface 210 of the sidewall between each aperture 214. The recesses 226 provide clearance for the projections 168 of the ejector 166 that are arranged to be inserted in each aperture 114 of the metering member 100. The recesses 226 are not open to the inner surface 208 of the sidewall 204. Thus there are additional projections 228 on the inner surface of the sidewall 204 between the apertures 214. Alternatively, the projections 228 and the paddles 216 can be formed as a single projections extending from the inner surface 208.

Having described the planting unit, it will become apparent that various modifications can be made without departing from the scope of the accompanying claims.

What is claimed is:

1. A planting unit for a seeding machine comprising:
    a seed meter having a metering member mounted for rotation, the metering member having a sidewall extending to an outer edge, the sidewall having inner and outer surfaces, a rim portion of the sidewall adjacent the outer edge having apertures extending through the sidewall for adhering seed to the inner surface of the metering member to sequentially move individual seeds to a release position wherein seed adhered to the metering member are moving in a first direction at the release position; and
    a mechanical seed delivery system having a conveyor member, the conveyor member receiving seed from the metering member at the release position, moving seed in a second direction substantially cross-wise to the first direction, and carrying seed to a discharge location adjacent a seed furrow formed in soil beneath the seeding machine.

2. The planting unit of claim 1 wherein the second direction is at least 35° to the first direction.

3. The planting unit of claim 1 wherein the second direction is at least 50° to the first direction.

4. The planting unit of claim 1 wherein the seed delivery system moves seed in the second direction that is between 50° and 80° to the first direction of travel of the seed on the metering member at the release position.

5. The planting unit of claim 1 wherein the mechanical seed delivery system has a housing in which the conveyor member moves to carry seed from the seed meter to the discharge location, the delivery system housing having an opening in which the sidewall of the metering member is received.

6. The planting unit of claim 1 wherein the conveyor member comprises a brush belt having bristles that sweep over the metering member sidewall at the release position to take seed from the metering member and to carry the seed to the discharge location.

7. The planting unit of claim 6 wherein the metering member includes a projection on the metering member inner surface following each aperture in a direction of rotation of the metering member, the projections pushing seed into the bristles of the brush belt.

8. The planting unit of claim 6 wherein seed enters the bristles of the brush belt at distal ends of the bristles.

\* \* \* \* \*